United States Patent [19]

House

[11] Patent Number: 4,466,911

[45] Date of Patent: Aug. 21, 1984

[54] ELECTRICALLY CONDUCTING POLYMERS

[75] Inventor: David W. House, Arlington Heights, Ill.

[73] Assignee: UOP Inc., Des Plaines, Ill.

[21] Appl. No.: 433,943

[22] Filed: Oct. 12, 1982

[51] Int. Cl.$^3$ ............................................. H01B 1/06
[52] U.S. Cl. .................................. 252/500; 252/514; 252/518; 528/392; 528/397; 528/487; 528/488; 528/490; 524/612
[58] Field of Search ............... 252/512, 518, 500, 514; 528/392, 397, 487, 488, 490; 524/612, 401, 411, 412, 429, 438; 525/356, 357, 360, 540

[56] References Cited

U.S. PATENT DOCUMENTS 4,222,903  9/1980  Heeger et al. ...................... 252/518
4,344,869  8/1982  Blinne et al. ........................ 252/500
4,375,427  3/1983  Miller et al. ......................... 252/518
4,395,497  7/1983  Naarman et al. ................... 252/500
4,401,590  8/1983  Yoshimura et al. ................ 252/514
4,407,739  10/1983 Naarmann et al. ................. 252/518

Primary Examiner—Josephine Barr
Attorney, Agent, or Firm—James R. Hoatson, Jr.; Eugene I. Snyder; William H. Page, II

[57]  ABSTRACT

The polymers resulting from reaction of a 1,1,2,2-tetrahaloethane with a diamine of the type $H_2NANH_2$, where A is a divalent aromatic moiety, may be doped with a variety of materials to afford electrically conducting polymeric compositions. Poly(ethyleneiminobenzene) is an especially useful material. Both p-type and n-type conductors may be formed.

8 Claims, No Drawings

ELECTRICALLY CONDUCTING POLYMERS

BACKGROUND OF THE INVENTION

Although organic polymers have replaced metals in many structural contexts, thus far they have failed to replace metals when the latter are used as electrical conductors or semiconductors. The impetus for such replacement includes, among others, lower cost, lower weight of materials, and increased processing variability for polymers as compared with metals. For example, polymers readily can be cast as films, foils, and fibers by standard, time-tested procedures. Polymers can be formed into a limitless variety of shapes and dimensions by standard processing procedures, thereby adding to the potential benefit of electrically conducting polymers.

A potential use for electrically conducting polymers is as electrodes or components of batteries, where their low weight and possibly unlimited scope of design are attractive. Electrically conducting polymers also could find use in construction of solar cells. Where such polymers are photoconducting they would undoubtedly find applications in the electrophotographic industry.

The conductivity ranges characterizing insulators, semiconductors, and metallic conductors are somewhat arbitrary, but for convenience we may say an insulator has a conductivity less than about $10^{-10}$ ohm$^{-1}$ cm$^{-1}$, a conducting metal has a conductivity greater than about $10^2$ ohm$^{-1}$ cm$^{-1}$, and a semiconductor has a conductivity between the above. In some cases organic polymers which are insulators show a sufficient increase in conductivity upon doping to act as semiconductors. By "doping" is meant adding a compound, referred to as a dopant, to the polymer so as to form a redox system wherein an electron is transferred from the polymer to the dopant, or vice versa. Two common examples of dopants are iodine (an electron acceptor) and sodium naphthalide (an electron donor). When the polymer transfers an electron to the dopant to exhibit semiconductor properties it is called a p-type semiconductor because conduction occurs mainly via holes in the valence band. Conversely, when the polymer accepts an electron from the dopant to exhibit semiconductor properties it is called an n-type semiconductor because conduction occurs mainly via electrons in the conduction band.

It is desirable for a normally insulating polymer to become a semiconductor upon doping by both p- and n-type dopants. It is also desirable that the polymer respond to a wide variety of dopants, and for its conductivity to be relatively responsive to changed levels of dopant. It is also desirable that the conductivity properties of the polymer remain stable over time and upon air exposure of the polymer. It is also quite desirable that upon doping the polymer remain flexible rather than becoming brittle.

It is a discovery of this invention that certain condensation polymers of 1,1,2,2-tetrahaloethanes and aromatic diamines, and which have the structure,

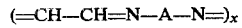

where A is an aromatic moiety selected from the group consisting of benzene, naphthalene, biphenyl, pyridine, and acridine, are polymers which show many of the aforementioned properties. In particular, the polymer from a 1,1,2,2-tetrahaloethane and 1,4-diaminobenzene, poly(ethyleneiminobenzene), hereafter referred to as EIB, is normally an insulator whose conductivity increases to about $10^{-4}$ ohm$^{-1}$ cm$^{-1}$ upon doping with an electron acceptor such as iodine. In addition to these properties as a p-type semiconductor, EIB can be doped with an electron donor such as sodium naphthalide to behave as an n-type semiconductor. An unexpected and highly advantageous property of EIB after being doped is that some such doped polymers are pliable in contrast to the brittle character of undoped EIB, thereby facilitating production of shaped electrically conducting polymers.

Polyacetylene and poly(p-phenylene) exemplify some better, perhaps the best, prior art electrically conducting polymers, hence their limitations exemplify the prior art constraints. Although polyacetylene may be doped with p- and n-type dopants, all doped as well as undoped polyacetylene are unstable in air. Thus the electrical properties, which are of greatest interest in this application, are useful for only short periods in air. In contrast, poly(p-phenylene) itself is air stable but it affords air unstable, electrically conducting polymers with both p- and n-type dopants. However, these materials invariably are amorphous powders which cannot be cast, hence their processability is severely limited.

DESCRIPTION OF THE INVENTION

In one aspect the invention which is disclosed and claimed is a method of preparing an electrically conducting polymer comprising contacting a polymer with the structure,

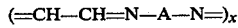

with a dopant, and recovering the resulting doped polymer.

In another aspect the invention is the electrically conducting polymer itself, which comprises a polymer with the aforementioned structure and a dopant, the latter being present in a mole ratio up to about 4.

The polymers of this invention have an extended, linear conjugated system which is believed to afford the basis of electron flow. In its ground state the polymer has its highest bonding orbital completely filled, and its lowest antibonding orbital totally unoccupied. In such a state the polymer would be nonconducting,—i.e., an insulator—because of the absence of charge carriers, despite the fact that both orbitals above are extensively delocalized. If the gap between the aforementioned orbitals were sufficiently small, thermal excitation would promote some fraction of electrons from the highest bonding orbital, or valence band, into the lowest antibonding orbital, or conduction band. There would be "holes" in the valence band and electrons in the conduction band, both of which are charge carriers, and the polymer would be electrically conducting. A similar electron transfer could accompany absorption of light, in which case the polymer would be a photoconductor.

Because the band gap of the polymer in question is too large for appreciable thermal population of the conduction band, a different mode of introducing charge carriers is needed. As stated above, dopants are materials which form a redox system with the subject polymer. The function of a dopant is to introduce charge carriers into the polymer. Where the dopant is an oxidizing agent and removes an electron from the highest filled orbital of the polymer it creates "holes" in the valence band which are p-type charge carriers. Analogously, where the dopant is a reducing agent and adds an electron to the lowest unoccupied orbital of the polymer it puts electrons into the conduction band which are n-type charge carriers. Dopants which cause a polymer to behave as p- or n-type conductors, respectively, are call p- or n-type dopants.

The polymers of this invention have the repeating unit,

$$(=CH-CH=N-A-N=)$$

The moiety A is an aromatic divalent moiety whose parent is a moiety such as benzene, naphthalene, anthracene, biphenyl, pyridine, azobenzene, acridine, stilbene, and so forth. Examples of aromatic diamines which are the source of the moiety A include 1,4-diaminobenzene, 1,3-diaminobenzene, 1,2-diaminobenzene, 4,4'-diaminodiphenyl and the other isomeric diaminodiphenyls where each of the rings bears only one amino group, the isomeric diaminopyridines, the isomeric diaminoacridines where each of the lateral fused rings bears one amino group, and especially 3,6-diaminoacridine, the isomeric diaminostilbenes, particularly 4,4'-diaminostilbene, and the isomeric diaminoaphthalenes, diaminoanthracenes, and diaminoazobenzenes.

The polymers of this invention may be prepared by reacting in solution approximately equimolar proportions of a 1,1,2,2-tetrahaloethane and aromatic diamine in a dipolar aprotic solvent, such as dimethylacetamide, in the presence of a base sufficient to remove formed acid and at a temperature from about 20° C. to about 100° C. The use of a dipolar aprotic solvent permits the polymer to be readily cast from such solutions to afford films which, once dry, are insoluble. Tertiary amines are convenient and effective bases in the practice of this invention. 1,1,2,2-Tetrabromoethane is the reactant of choice, although the chloro and iodo analogues may be used but not necessarily with equivalent results.

The polymer EIB itself is an insulator, showing a conductivity less than $10^{-10}$ ohm$^{-1}$ cm$^{-1}$. However, when doped with either p-type or n-type dopants the conductivity increases to about $10^{-4}$ ohm$^{-1}$ cm$^{-1}$. Where the dopant is itself air stable, it has been found that the electronically conducting doped polymer is relatively air stable as manifested by unchanged conductivity over a period of several weeks.

As examples of p-type dopants there may be cited bromine, chlorine, and iodine; SbF$_5$, AsF$_5$, PF$_5$, and related compounds where fluorine is replaced by a highly electronegative, non-nucleophilic group; AgClO$_4$ as representative of a silver compound with a non-nucleophilic anion; NO$_2$X and NOX, where X is a non-nucleophilic anion such as SbF$_6^-$, FB$_4^-$, and so on; and sulfuric and perchloric acids.

Examples of n-type dopants are more limited. The most common such dopants are alkali metal salts of the radical anions of aromatic systems, as exemplified by sodium naphthalide.

Electrochemical doping introduces additional variants. For example, if the polymer serves as the cathode in a medium containing a tetraalkylammonium perchlorate as the electrolyte, the polymer becomes reduced, thereby exhibiting n-type conduction, and the tetraalkylammonium cation serves as a dopant by impregnating the polymer to preserve electrical neutrality. When the polymer serves as the anode it becomes oxidized and exhibits p-type conduction with the perchlorate anion serving as the dopant.

The amount of dopant incorporated into the polymer to give the electrically conducting system is subject to wide variation, depending, for example, on the dopant and the conductivity desired. In the case of iodine, for example, the mole ratio dopant to repeating unit of polymer may be as low as about 0.5 and up to about 5. Generally a mole ratio from about 0.1 to about 3.5 is most commonly employed.

When EIB was treated with some of the dopants of this invention it displayed a remarkable change in physical properties. For example, when EIB was doped with iodine the originally brittle material assumed a pliable, somewhat tacky consistency. This iodine-doped polymer could be readily "painted" onto surfaces, i.e., deposited as a thin film assuming the shape of the surface, and could be readily molded into virtually any shape desired.

The examples given below merely serve to illustrate this invention and are not intended to limit it in any way.

EXAMPLE

Amorphous EIB was prepared as follows. To a 100 ml 3-necked, round-bottomed flask equipped with a mechanical stirrer and a reflux condenser were added, in a nitrogen atmosphere, 1.49 g (4.21 mmol) of 1,1,2,2-tetrabromoethane and 15 ml of N,N-dimethylacetamide. To the stirred solution was added 0.46 g (4.26 mmol) 1,4-diaminobenzene. The solution was stirred 0.5 hr at ambient temperature and 24 hrs at 55° C., whereupon 5 ml triethylamine was added. After 4 hr volatiles were removed, in part, by a stream of nitrogen blown over the surface. Solids were removed by filtration and the liquid was permitted to solidify by exposure to air with accompanying evaporation of volatiles. The polymer had a glassy, dark purple appearance.

Pellets for electrical conductivity testing were prepared by adding a measured amount of the polymer powder to a Beckman IR pellet press. The pellets were 1.3 cm in diameter with a thickness determined by the amount of material pressed and the pressure used.

To obtain reliable conductivity data which could be duplicated it was found necessary to dry the material thoroughly in vacuum. Accordingly, after being pressed all pellets were dried at 100° C. at 0.2 mm Hg for several hours. Pellets normally were removed and stored under nitrogen until testing.

Iodine doping was carried out by adding an iodine crystal to a chamber containing a pellet of EIB. The chamber then was evacuated causing immediate sublimation of iodine. Gaseous iodine remained in contact with a pellet for a period from about 1.5 to about 17 hours, whereupon the doped pellet was removed and stored under nitrogen until being tested.

For example, when a pellet of EIB, whose conductivity was $10^{-10}$ ohm$^{-1}$ cm$^{-1}$, was exposed to iodine for 17 hours it incorporated 1.07 mole iodine per mole EIB, with the doped material having a conductivity of $7.1 \times 10^{-5}$ ohm$^{-1}$ cm$^{-1}$.

Doping of EIB with sodium naphthalide may be accomplished by contacting the polymer powder with a slurry of sodium naphthalide in dry tetrahydrofuran. After the mixture is stirred under nitrogen for 24 hours, excess sodium naphthalide and solvent may be removed with a pipette. The remaining solvent may be evaporated in a stream of nitrogen and the doped polymer may be dried as described above but at room temperature.

What is claimed is:

1. An electrically conducting polymer composition comprising a polymer whose repeating unit has the structure, (=CH—CH=N—A—N=)

where A is an aromatic divalent moiety whose parent is selected from the group consisting of benzene, napthalene, anthracene, biphenyl, azobenzene, pyridine, acridine and stilbene and an effective amount, sufficient to increase electrical conductivity, of a n-type or p-type dopant.

2. The composition of claim 1 where A is the 1,4-divalent benzene moiety.

3. The composition of claim 1 where the dopant is an n-type dopant.

4. The composition of claim 3 where the dopant is an alkali metal salt of an aromatic radical anion.

5. The composition of claim 1 where the dopant is a p-type dopant.

6. The composition of claim 5 where the dopant is a quaternary ammonium salt of an unreactive non-nucleophilic anion.

7. The composition of claim 5 where the dopant is selected from the group consisting of chlorine, bromine, iodine, $SbF_5$, $AsF_5$, $PF_5$, $AgX$, $NO_2X$, and $NOX$ where X is an unreactive, non-nucleophilic anion.

8. The composition of claim 1 where an effective amount is a mole ratio of dopant to polymer to about 5.